United States Patent
Samson

(10) Patent No.: US 8,209,710 B2
(45) Date of Patent: Jun. 26, 2012

(54) IMPLEMENTATION SYSTEM FOR BUSINESS APPLICATIONS

(75) Inventor: Eric Samson, Paris (FR)

(73) Assignee: Xcalia, Paris (FR)

( * ) Notice: Subject to any disclaimer, the term of this patent is extended or adjusted under 35 U.S.C. 154(b) by 1105 days.

(21) Appl. No.: 11/327,025

(22) Filed: Jan. 5, 2006

(65) Prior Publication Data

US 2007/0089117 A1 Apr. 19, 2007

(30) Foreign Application Priority Data

Sep. 22, 2005 (FR) ...................................... 05 09714

(51) Int. Cl.
*G06F 9/44* (2006.01)
*G06F 3/00* (2006.01)

(52) U.S. Cl. ........ 719/330; 719/320; 719/328; 719/331; 717/107; 717/108; 717/146; 717/162; 717/165

(58) Field of Classification Search .......... 709/201–203; 707/1; 712/220–248; 719/330
See application file for complete search history.

(56) References Cited

U.S. PATENT DOCUMENTS

| | | | |
|---|---|---|---|
| 6,085,198 A * | 7/2000 | Skinner et al. ............. | 707/103 R |
| 6,532,465 B2 * | 3/2003 | Hartley et al. ................. | 707/10 |
| 6,611,838 B1 * | 8/2003 | Ignat et al. ............................. | 1/1 |
| 6,662,188 B1 * | 12/2003 | Rasmussen et al. ................... | 1/1 |
| 2003/0172084 A1 * | 9/2003 | Holle ............................. | 707/101 |
| 2003/0204487 A1 * | 10/2003 | Sssv et al. ......................... | 707/1 |
| 2004/0148588 A1 * | 7/2004 | Sadiq ............................. | 717/109 |
| 2004/0177360 A1 * | 9/2004 | Beisiegel et al. ............. | 719/316 |
| 2004/0181537 A1 * | 9/2004 | Chawla et al. ................. | 707/100 |
| 2004/0181775 A1 * | 9/2004 | Anonsen et al. ............... | 717/104 |
| 2004/0187140 A1 * | 9/2004 | Aigner et al. .................. | 719/328 |
| 2005/0015619 A1 * | 1/2005 | Lee ................................. | 713/201 |
| 2005/0050311 A1 * | 3/2005 | Joseph et al. ....................... | 713/1 |
| 2005/0203931 A1 * | 9/2005 | Pingree et al. ................. | 707/100 |
| 2005/0203951 A1 * | 9/2005 | Schroeder et al. ........ | 707/103 Z |
| 2005/0256882 A1 * | 11/2005 | Able et al. ....................... | 707/10 |

FOREIGN PATENT DOCUMENTS

FR 2891077 A1 3/2007

OTHER PUBLICATIONS

"Xcalia Revolutionizes the Integration Market, Making SOA Implementation Easy with the First Intermediation Platform" (2005) SOA Forum p. 1-3.

(Continued)

*Primary Examiner* — Lechi Truong
*Assistant Examiner* — Shih-Wei Kraft
(74) *Attorney, Agent, or Firm* — Patent Law Works LLP

(57) ABSTRACT

The system comprises a man-machine interface for controlling the application, a server running the application, a server hosting the service and a server for automatically calling the service, including memory resources containing the data describing the service, receive the data related to the service and transform that data so that it can be processed in the application server, all of which under the control of the man-machine interface and the application server.

14 Claims, 2 Drawing Sheets

OTHER PUBLICATIONS

"Netmanage Librados Adapters Offer Easier Access to Back-End Systems for Xcalia" (2005) MetManage.

Arsanjani, Ali et al. "Manner Externalize Semantics for On-Demand Composition of Context-Aware Services" (2004) IEE Int'l Conference (ICWS).

Castellano, Marcello et al. "An e-Government Cooperative Framework for Government Agencies" (2005) IEE 38$^{th}$ Hawaii Int'l Conference.

Chung, Moon Jung et al. "A Framework for Collaborative Product Connerce Using Web Services" (2004) IEEE Int'l Conference (ICWS).

Agarwala, Sandip et al "Lightweight Morphing Support for Evolving Middleware Data Exchanges in Distributed Applications" (2005) IEEE Int'l Conference (ICSCS).

Poellabauer, Christian "Service Morphing: Integrated System-and Application-Level Service Adaptation in Autonomis Systems" (2003 IEEE Int'l Workshop (AMS).

Agarwala, S. et al., "Lightweight Morphing Support for Evolving Middleware Data Exchanges in Distributed Applications," 25$^{th}$ IEEE International Conference on Distributed Computing Systems, ICDCS 2005, Jun. 6-10, 2005, pp. 697-706.

Arsanjani, A. et al., "Manners Externalize Semantics for On-Demand Composition of Context-Aware Services," IEEE International Conference on Web Services, ICWS'04, Jul. 6-9, 2004, pp. 583-590.

Castellano, M. et al., "An E-Government Cooperative Framework for Government Agencies," Proceedings of the 38$^{th}$ Hawaii International Conference on System Sciences, Jan. 3, 2005, pp. 1-9.

Chung et al., "A Framework for Collaborative Product Commerce Using Web Services," IEEE International Conference on Web Services, ICWS'04, Jul. 6-9, 2004, pp. 52-60.

Kappos, D.J., Director of the United States Patent and Trademark Office, "Subject Matter Eligibility of Computer Readable Media," Jun. 26, 2010, 1 page.

"Netmanage Librados Adapters Offer Easier Access to Back-End Systems for Xcalia," pp. 1-3, [Online] [Retrieved Jul. 18, 2005] Retrieved from the Internet<URL:http://www.xcalia.com/news/press-releases/PR__2005-07-18.pdf>.

Poellabauer, C. et al., "Service Morphing: Integrated System-and Application-Level Service Adaptation in Automatic Systems," Proceedings of the Autonomic Computing Workshop, Jun. 25, 2003, pp. 98-107.

"Xcalia Revolutionizes the Integration Market, Making SOA Implementation Easy with the First Intermediation Platform," pp. 1-3, [Online] [Retrieved Jun. 15, 2005] Retrieved from the Internet<URL:http://www.xcalia.cominews/press-releases/PR__2005-06-15.pdf>.

* cited by examiner

IMPLEMENTATION SYSTEM FOR BUSINESS APPLICATIONS

BACKGROUND OF THE INVENTION

This invention relates to an implementation system for business applications that can be used to federate the data received from data providers into a common set and process said set in real time.

The first developments of this variety were produced in certain major corporations. They were used during the manufacturing stage to computer process the IT data received from specific businesses by automatically transferring a computer file in so-called neutral format.

The emergence of Intranets and the Internet, and especially the growth in the number of computerized businesses, has led to the need for increased automatic exchanges between those businesses.

International organizations began thinking of SOAs (Service-Oriented Architectures), in which the business applications are based on services instead of coded entities, for the purpose of more effectively gearing the new information technologies towards the company's businesses and introducing a higher degree of flexibility into their working environment.

Services, or functional services, are actually taken to mean functional IT modules, such as functional modules of payroll, invoicing, production management, technical data and client systems, or CAD (Computer-Aided Design) and CAM (Computer-Aided Manufacturing) modules, and so on. The last meaning given will be used in the remainder of this document.

Currently, an approach extending that used for neutral formats involves developing a standard bus capable of supporting computer exchanges between heterogeneous services or businesses. The ESB (Enterprise Service Bus) is one example. Such a solution works all the time that the exchange requirements are low, but beyond that, the solution is not necessarily efficient.

Furthermore, the work performed by standardization groups, such as OMG (Object Management Group), JDO (Java Data Object), JCA (Java Connector Architecture), JMS (Java Messaging Service), EJB (Enterprise JavaBeans) and SOAP (Service-Oriented Architecture Protocol), is common knowledge.

These working groups particularly rely on the capacities of the Java languages (programming language for the Web), as well as the WSDL (Web Service Definition Language) and OWL languages (Web Ontology Language) for developing business applications on the Web.

Work is also focusing on languages for corporate metadata, such as EMD (Enterprise Metadata Discovery), but it is still unfinished or deliberately incomplete.

Obviously, the first step in all this work is to manage to formally describe the most common services and businesses by using data describing the services, known as metadata, but the problem is a difficult one, due to the diversity and complexity.

The diversity is increased even more by the wide range of systems or servers hosting them:
Transaction processing mainframe systems (CICS—Custom Information Control System—or transaction processing monitors for mainframes), middleware, MQSeries (asynchronous message-oriented middleware), ERP (Enterprise Resource Planning), DBMS (Database Management Systems), possibly RDBMS (Relational Database Management Systems) or OODBMS (Object-Oriented Database Management Systems), and the use of query languages, such as SQL (Structured Query Language), and object-oriented languages, such as OOQL (Object-Oriented Query Language)

Systems hosting business applications written in Web language, such as Java, HTML (Hypertext Markup Language) and XML (Extended Markup Language)

For example, if we consider an application used by a consumer goods company to view its customer invoices on the Web, this Java business application must have access to the data relating to an invoicing service, a customer service and a product service. This data is presumed to reside in memory blocks, but it is not. In the current example, it can only be retrieved by querying an RDBMS and must be translated into XML data. As most of these operations are manual, the invoices cannot be viewed in real time, which means that the system is impracticable.

In brief and to simplify matters, an SQL application cannot be used to query or even call callable services over the Web, and conversely, a Web-based Java application cannot be used to call and query a service related to an RDBMS or a transaction processing system, nor receive data associated with the requested service.

Consequently, even if the data describing the services or businesses in question were available, it would be impossible to create a consistent dataset containing federated data from the Web and from an RDBMS or OODBMS, or in any other system above, and especially process that set in real time.

The applicant has been present in the market for several years via its work in the field of query software for large-capacity databases, such as RDBMS and OODBMS, and other data sources available on the Web, XML and binary files. As part of its wish to extend the scope of its products to SOA service-oriented architectures, the applicant came upon the idea for its invention.

SUMMARY OF THE INVENTION

Therefore, the invention relates to an implementation system for business applications based on at least one callable functional service, comprising a man-machine interface for controlling the application, a server running the application, a server hosting the service and a server for automatically calling the service, including memory resources containing the data describing the service and business on the application, and designed to call the service, receive the data related to the service and transform that data so that it can be processed in the application server, all of which under the control of the man-machine interface and the application server.

The service-related data will preferably be transformed automatically.

A callable service is taken to mean a service comprising an API (Application Programming Interface).

The server for automatically calling the service acts as an intermediary between the server running the application and the server hosting the service.

To do so, the server for automatically calling the service comprises an intermediation module designed to substitute for the business application during the time required to send a service-related data business query to the server hosting the service and return the data to it. The business application can therefore process the service-related data in real time.

The server for automatically calling the service preferably comprises a mapper module featuring the memory resources containing the data describing the service and the data describing the business on the application for calculating the data describing the execution of the business queries and arranging them in the memory resources. In particular, this allows for the subsequent processing of business requirements that are not known during development.

The intermediation module has the advantage of featuring an execution block for substituting for the business application during a query phase. To do so, the application query phase is executed via a compiled query program, where said compiled program is enhanced with call commands for the intermediation module in the appropriate parts of the program when post-compiling on said program.

To query the service-related data, the intermediation module is designed to extract the data describing the execution of the business queries from the memory resources containing them, and to query the service-related data, the execution block features a translation function designed to translate the queries to the service into calls compliant with the API (Application Programming Interface), a selection function designed to select a driver according to the type of server hosting it and a command function for the selected driver and for executing the translated queries.

As the implementation system preferably contains at least two callable services, the intermediation module features a rule engine block designed to calculate, schedule and arrange the data describing the organization of the calls to said services in a program memory block.

The rule engine block is designed to calculate execution rules for the calls to the services according to a business application query, the data describing the services and business, and the grammar.

A noteworthy characteristic of the invention is that there is no need to translate the data related to one of the services into data related to one of the other services to execute the business application. The native data for each service is used in Web language, such as XML, which ensures that the results are as integral and complete as possible, where this data alone is capable of meeting the most demanding of production requirements.

The server for automatically calling the service is preferably connected to a general-purpose computer network of the Internet or Intranet variety to serve as a data server or benefit from the Web services, and can be called from the server running the application and is connected to a company's specific computer network, such as an Ethernet type, of database management systems hosting services.

BRIEF DESCRIPTION OF THE DRAWINGS

The invention will be easier to understand when reading the following description of the implementation system for business applications, according to the invention and the accompanying diagram, wherein.

DETAILED DESCRIPTION

Figure 1:
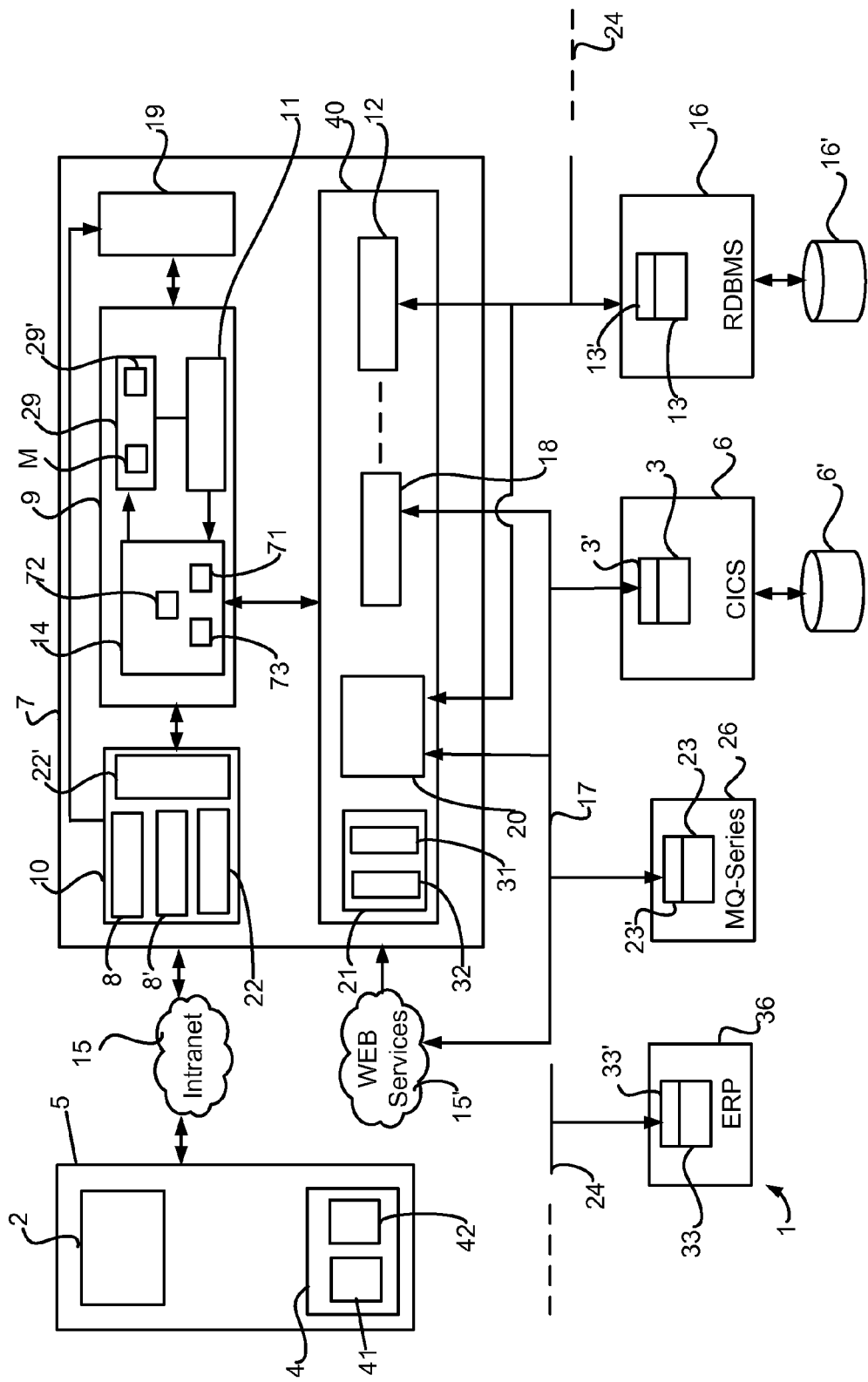
FIG. 1 represents the functional block diagram of the implementation system for business applications, according to the invention, based on several callable services

With reference to FIG. 1, the system (1) comprises:
1) A server (5) featuring a man-machine interface (4), comprising a keyboard (41) and a monitor (42), which is used to run a functional or business application (2); in other words, whose function enables a business to be performed—for example, a company business as described above
2) A set of heterogeneous computer systems (6, 16, 26, 36), each hosting services (3, 13, 23, 33). This set comprises the above-mentioned systems—in the example in FIG. 1, a CICS transaction processing system (6) and its transactional database (6'), a middleware or MQSeries system (26), an ERP (36), an RDBMS (16) and the relational database (16') of the system (16)
3) An intermediate server (7) between the server (5) and the set of systems (6, 16, 26, 36) and which will be described further on
4) A set of computer networks (15, 15', 17, 24) linking the servers (5, 7) and the systems (6, 16, 26, 36). This set comprises:
A computer network (17), such as an Ethernet network, linking the transaction processing systems (6, 26) to the intermediate server (7) and/or an external computer network (15'), the Internet in this case, to which the server (7) is also linked
A network (24), of the Ethernet variety or other, linking the corporate systems (16, 36) and/or the servers (5, 7)

In the example in FIG. 1, the intermediate server (7) is linked to the application server (5) by an Intranet (15), for example also by an Ethernet link, and to the Internet (15')—on the one hand, to be controlled if required from a Web-based application, and on the other, to query Web services, such as by using a Web language (e.g. WSDL or SOAP).

Each service (3, 13, 23, 33) comprises an API (3', 13', 23', 33'), so that it can be called, programmed and executed by the network channel to which it is connected.

The business application (2) is based on the processing of service data, which can be retrieved by calling the services from among 3, 13, 23 and 33. It is controlled by the interface (4).

The intermediate server (7) will now be described.

It conventionally features all the control/command methods (not represented), such as a supervisor and real-time monitors, an input/output module (40) and, specifically in this case, a mapper module (10) or EDME (Entity Data Mapping Engine) and an intermediation module (9).

The mapper module (10) is a mapping engine for the data describing the services (3, 13, 23, 33) and the BMM (Business Method Model) metadata on the business application (2).

There are two types of data describing the services (3, 13, 23, 33) as follows:
SEM (Service Entity Model) metadata arranged in memory block 8 of the memory resources of the mapper module (10)
Service Method Model (SMM) metadata arranged in another memory block (8') of the memory resources
The BMM metadata is arranged in a third memory block (22) of the mapper module.

The mapping of the data describing the services (3, 13, 23, 33) and the BMM metadata are stored as mapping tables in a fourth memory block (22') for each application (2) query when executed in real time by the mapper (10).

The mapping tables (22') are deduced logically.

Figure 2:
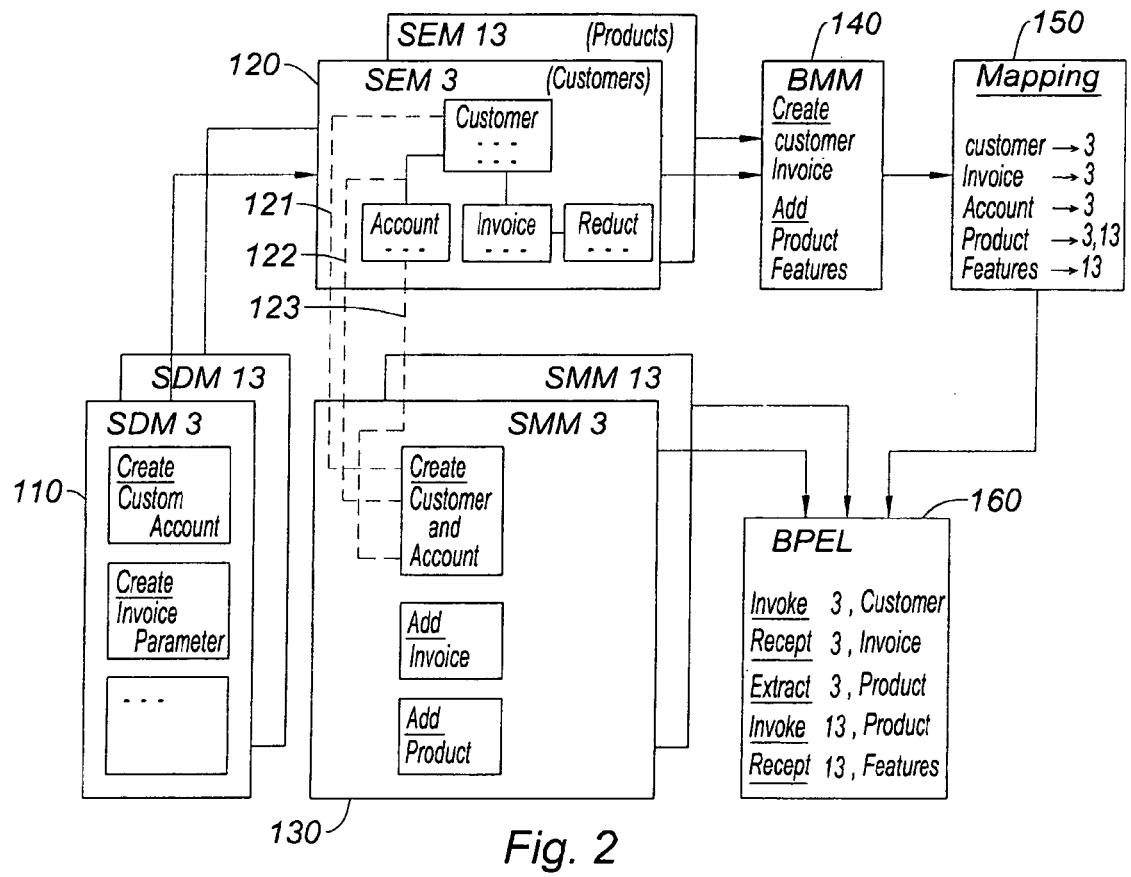
FIG. 2 is a simplified illustration of the management of the memories describing the services, the business and the program memory in the simple case of an application for viewing invoices

For example, by considering the application mentioned earlier for viewing invoices, as illustrated in FIG. 2, memory blocks 8 and 8' are initialized with the SEM and SMM metadata of all services of use to the business application (2), where for each service the metadata describes the structure (120) of the service in memory block 8 and the method (130) for creating the structure (120) of the service in memory block 8', based on the "bibliographical" SDM (Service Description Model) metadata (110).

In the example in FIG. 2, an initial service (3) is a database of the structure (120), identified as SEM 3, containing hierarchical data or entities, where the customer reference entity covers the account, invoice and product reference entities. The structure (120) of the second service (13), identified as SEM 13, cannot be seen and more simply contains a product reference entity with which a product description is associated.

Based on a list (140) of BMM business data subject to an application (2) query for the product feature description of a product subject to a customer invoice, the mapper module (10) deduces the mapping table (150), indicating the useful services (3, 13) and supplying the useful entities for providing the service responses to the query and stores it in memory 22. An incompatibility between the business requirements and the available services may be detected at this level of processing.

Furthermore, the mapper module (10) arranges the metadata in memory blocks 8, 8' and 22 for services 3, 13, 23 and 33 into a directory (19), which is arranged by the references of the callable services (3, 13, 23, 33) with the characteristics of the corresponding APIs (3', 13', 23', 33').

The intermediation module (9) comprises an execution block (14), a rule engine block (29) containing an engine program (M), a memory block (29') containing the elements for the specific grammar (or metalanguage) and a program memory block (11).

The input/output block (40) comprises a set of bidirectional drivers (12, 18) adapted to the APIs of the different systems (6, 16, 26, 36) hosting the services (3, 13, 23, 33), a service response processing block (20) and a transceiver block (21).

Block 21 comprises a function (31) for transforming the service responses into data that can be read by the application (2) and a function (32) for sending to the application (2).

The execution block (14) comprises a selection function (71) designed to select the required driver according to the type of server (6, 16, 26, 36) hosting the service (3, 13, 23, 33), a translation function (72) designed to translate the queries to the services (3, 13, 23, 33) into calls compliant with their respective APIs (3', 13', 23', 33') and a function (73) for controlling the selected driver and executing the translated queries.

The rule engine (29) retrieves the contents of memory blocks 22 and 8', computes a query execution program and arranges the program in program memory block 11.

The query execution program in memory block 11 is computed as a program in formal language, referred to here as SEL (Symbolic Execution Language) or BPEL (Business Process Execution Language), and which can be considered as the data describing the organization of the calls to the services.

The SEL is the terminal language calculated from the contents of memory blocks 22 and 8', considered as a non-terminal language by applying the specific grammar (29').

Although the contents of memory blocks 22 and 8' change with each query, the grammar (29') is invariable and depends only on the configuration of the system (1). It is initially established according to the known mathematical methods in the field of artificial intelligence and expert systems, and is subsequently an integral part of the system (1). Part of its listing in XSD format (XML Scheme Definition) is given in the appendix.

To go back to the simple example of displaying customer invoice details, the engine program (M) of the rule engine (29) calculates the contents of program memory block 11, meaning the execution program (160) in symbolic execution language (SEL).

To do so, the engine program (M) first analyzes the SEM metadata (120) according to the analysis rules included in program M and predetermined by the structure of the services concerned and the facts. It deduces the SMM generation methods (130) according to the effect rules included in program M and predetermined by the results demanded from the various services, taking account of the hierarchical dependency links, such as those identified as 121, 122 and 123 between the entities, of the SEM data structure seen above.

Then according to the mapping (150) performed above, the SMM 3 and 13 data in 130 and the specific grammar (29') for the rule engine (29), it computes the execution program (160) for the calls to services 3 and 13, which orchestrates two successive calls—one to service 3 to find the product reference in the invoice of the customer performing the query, and the other to service 13 to find the features of the product above. In this case, the system (1) has transformed two real hierarchical databases into a virtual relational database.

The application (2) query is executed by running a service query program, belonging to the application (2) and expressed in a precompiled language, from the man-machine interface (4).

To ensure that the program can access the services, it is enhanced with call commands for the intermediation module (9) at appropriate parts of the program. Enhancement can be executed when post-compiling the program following compilation.

As the query program is programmed in Java language, the calls to the intermediation module (9) and the response from the module are programmed to comply with the currently known data access standards, such as JDO (JSR12) and SDO.

Finally, the BMM metadata for all applications (2) is arranged in directory 19 according to the business and application references when initially integrating the system (1).

Figure 3:
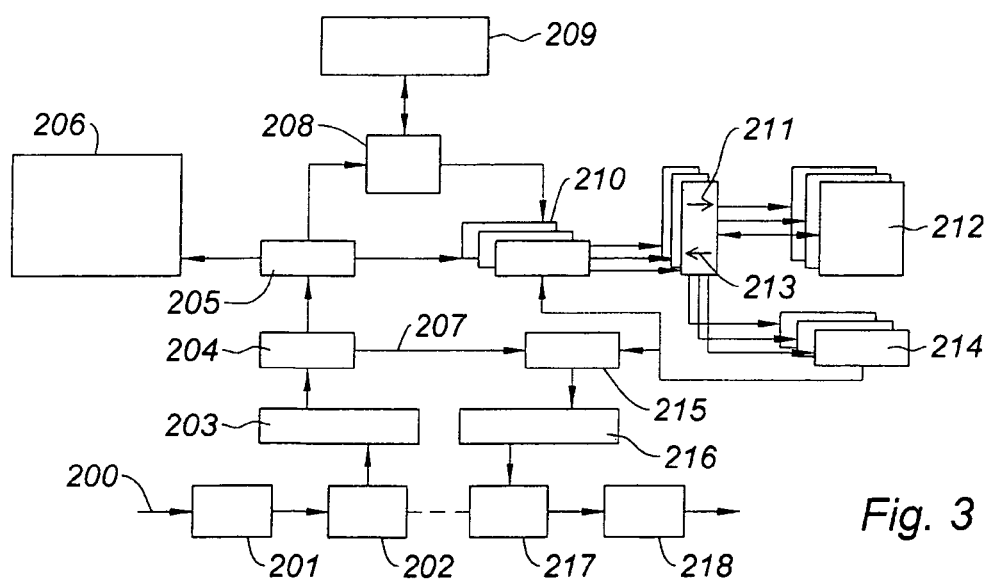
FIG. 3 is a chronological operating diagram of the system according to the invention The appendix contains a partial list of the specific grammar for the invention's rule engine.

The overall operation of the system (1) will now be described in reference to FIG. 3.

To perform a business application (2) query, the user orders a launch stage (200) for the application (2) via the interface (4) keyboard (41) for the server (5).

During stage 201, the application (2) launches a Java query program that executes a call (202) to the intermediation module (9) of the intermediate server (7), which is sent during stage 203 by the network channel (15), the input/output block (40) and the transceiver block (21). The call is referenced A, like the application (2), and contains the Ei entity references.

During stage 204, the intermediation module (9) searches in directory 19 for one or more service references from 3, 13, 23, 33 to be queried from the E entities subject to the query performed by the reference A application (2). Two cases may arise as follows:

1) Directory 19 contains references of Sj services matching the Ei entities, in which case the module (9) launches the mapper module (10), which during stage 205 retrieves (but it might be the intermediation module (9), as in FIG. 1) the SEMj and SMMj metadata of Sj in directory 19 and arranges it in memory blocks 8 and 8', retrieves the BMM metadata of the reference A application (2) and arranges it in memory block 22, and during stage 206 maps the contents of memory block 22' from the contents of memory blocks 8, 8' and 22, as seen earlier. Then the intermediation module (9) runs the execution block (14).

2) Directory 19 cannot find a reference for the Sj service matching the Ei entities, in which case the module (9) launches (207) a message indicating that there is no callable service for responding to the query. The message is sent over the network (15) by block 21.

In stage 208, the execution module (14) retrieves the SMMj contents and the mapping in memory blocks 8' and 22' respectively and runs the rule engine block (29), which generates the query execution program (BPEL) in stage 209 from the grammar (29') that it arranges in program memory block 11.

In stage 210, the execution block (14) reads the formal BPEL language in memory block 11, uses the selection function (72) to select the API driver (3', 13', 23', 33') of the service (3, 13, 23, 33) on the server (6, 16, 26, 36) hosting the service, translates it via its translation function (71) into queries for the selected API and executes the API queries via its function (73) by the channel for drivers 12 and 18 in the input/output block (40).

In stage 211, the selected service (3, 13, 23, 33) processes the API query and in stage 212 retrieves the data from the relevant database (6', 16') or performs the usual transactions with its data provider, such as the Internet (15').

In stage 213, the selected service (3, 13, 23, 33) returns the retrieved data in native format in Web language (e.g. XML), which ensures that the results are as integral and complete as possible, to the input/output block (40), which during stage 214 resends it to the execution block (14) to complete (by looping back to stage 210) the execution of the BPEL program in memory block 11 or to launch stage 215 for resending via block 21 of the input/output block (40) to the application (2) via the Intranet (15) channel (216).

When the service data is received during stage 217, the application (2) is rerun as if the data were present in the memory of the server (5) hosting the application.

At the next stage (218), the application is continued.

It can be seen that the intermediate server (7) is a true server for automatically calling the services that acts as an intermediary between a business server comprising business applications and complementary computerized services (3, 13, 23, 33) hosted on the heterogeneous systems of a mixed range of data providers.

The invention claimed is:

1. A system for addressing incompatibility between services and applications, the system comprising:
    a non-transitory computer-readable medium storing computer-executable code, the computer-readable medium comprising:
        an intermediation module configured to receive a first call from an application and retrieve from a directory a reference to a service associated with the application;
        a mapper module, communicatively coupled to the intermediation module, to retrieve from the directory (1) service metadata describing the service and (2) business metadata describing business on the application, the mapper module generating, based at least in part on a list of the business metadata subject to an application query, a mapping table that maps the business metadata to the service metadata for providing a response to the application query, the mapper module determining if an incompatibility exists between a business requirement associated with the application and the service;
        an execution module, communicatively coupled to the mapper module, to select and execute an interface of the service based on the mapping of the business metadata and the service metadata; and
        a rule engine, communicatively coupled to the mapper module, configured to create an execution program based on the mapping of the service metadata and the business metadata; and
    wherein the execution module selects the interface of the service based on the execution program, the execution program comprises data describing a first organization of the first call to the service and a second call to a second service, the rule engine is configured to create the execution program based on a hierarchical link between the service and the second service, and the execution module selects the interface of the service by translating a part of the execution program into the interface of the service.

2. The system of claim 1 wherein the service metadata includes a description of a structure of the service.

3. The system of claim 1 wherein the service metadata includes a method for creating a structure of the service.

4. The system of claim 1 wherein the service metadata includes a description of an entity useful for providing the service.

5. The system of claim 1 wherein the rule engine is configured to create the execution program based on a configuration of the system.

6. The system of claim 1 wherein tile execution program comprises data describing a second organization of a plurality of calls to the service.

7. The system of claim 1 wherein the execution module is configured to select a driver for a server hosting the service and execute the interface through the driver.

8. A method implemented by a processor for addressing incompatibility between services and applications, the method comprising:
    the processor:
        receiving a first call from an application;
        retrieving from a directory a reference to a service associated with the application;
        retrieving service metadata describing the service;
        retrieving business metadata describing business on the application;
        generating, based at least in part on a list of the business metadata subject to an application query, a mapping table that maps the business metadata to the service metadata for providing a response to the application query;
        determining if an incompatibility exists between a business requirement associated with the application and the service;
        selecting and executing an interface of the service based on the mapping of the business metadata and the service metadata; and
        creating an execution program based on the mapping of the business metadata to the service metadata; and
        wherein the selection of the interface on the service based on the mapping comprises selecting the interface based on the execution program, the execution program comprises data describing a first organization of the first call to the service and a second call to a second service, creating the execution program comprises creating the execution program based on a hierarchical link between the service and the second service, and the selection of the interface of the service comprises translating a part of the execution program into the interface of the service.

9. The method of claim 8 wherein the service metadata includes a description of a structure of the service.

10. The method of claim 8 wherein the service metadata includes a method for creating a structure of the service.

11. The method of claim 8 wherein the service metadata includes a description of an entity useful for providing the service.

12. The method of claim 8 wherein creating the execution program is based on a configuration of a system that executes the method.

13. The method of claim 8 wherein the execution program comprises data describing a second organization of a plurality or calls to the service.

14. The method of claim 8 wherein executing the interface comprises selecting a driver for a server hosting the service and executing the interface through the driver.

* * * * *